(12) United States Patent
Hrischuk et al.

(10) Patent No.: US 9,188,968 B2
(45) Date of Patent: Nov. 17, 2015

(54) RUN-TIME CHARACTERIZATION OF ON-DEMAND ANALYTICAL MODEL ACCURACY

(75) Inventors: Curtis E. Hrischuk, Holly Springs, NC (US); Edward Emil Huth, Royal Palm Beach, FL (US); Dazhi Wang, Durham, NC (US); Li Zhang, Yorktown Heighs, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 1629 days.

(21) Appl. No.: 12/344,052

(22) Filed: Dec. 24, 2008

(65) Prior Publication Data

US 2009/0138237 A1 May 28, 2009

Related U.S. Application Data

(63) Continuation of application No. 11/563,048, filed on Nov. 24, 2006, now Pat. No. 7,512,519.

(51) Int. Cl.
| | | |
|---|---|---|
| *G06F 7/00* | (2006.01) | |
| *G06F 7/02* | (2006.01) | |
| *G06F 7/22* | (2006.01) | |
| *G06F 7/32* | (2006.01) | |
| *G05B 17/02* | (2006.01) | |

(52) U.S. Cl.
CPC ........................................ *G05B 17/02* (2013.01)

(58) Field of Classification Search
CPC ....................................................... G05B 13/00
USPC ............ 702/179, 182, 183, 191–195; 375/76, 375/317; 382/276; 398/202
See application file for complete search history.

(56) References Cited

U.S. PATENT DOCUMENTS

| | | | | |
|---|---|---|---|---|
| 5,307,379 | A * | 4/1994 | Bergstrom et al. | ........... 375/317 |
| 5,570,346 | A | 10/1996 | Shur | |
| 5,583,792 | A | 12/1996 | Li et al. | |
| 6,990,252 | B2 * | 1/2006 | Shekter | .......................... 382/276 |
| 7,215,721 | B2 * | 5/2007 | Hietala et al. | .................. 375/317 |
| 7,512,519 | B2 * | 3/2009 | Hrischuk et al. | ............... 702/179 |

OTHER PUBLICATIONS

Waheed et al., "Modeling, Evaluation, and Testing of Paradyn Instrumentation System", Proceedings of the 1996 ACM/IEEE Conference on Supercomputing (1996).

(Continued)

*Primary Examiner* — Eliseo Ramos Feliciano
*Assistant Examiner* — Felix Suarez
(74) *Attorney, Agent, or Firm* — Cuenot, Forsythe & Kim, LLC (57) ABSTRACT

A method of determining accuracy of predicted system behavior can include creating a plurality of noise adjusted analytical models, wherein each noise adjusted analytical model is associated with a set of predefined analytical model parameters. A set of inferred analytical model parameters for each noise adjusted analytical model can be derived. Each set of inferred analytical model parameters can depend upon a current noise adjusted analytical model and each prior noise adjusted analytical model. For each set of inferred analytical model parameters, a measure of error between the set of inferred analytical model parameters and the set of predefined analytical model parameters associated with the noise adjusted analytical model from which the set of inferred analytical model parameters was derived can be determined.

20 Claims, 5 Drawing Sheets

(56) References Cited

OTHER PUBLICATIONS

Woodside et al., "Performance by Unified Model Analysis (PUMA)", Workshop on Software and Performance, Proceedings of the 5th International Workshop on Software Performance, Jul. 12-14, 2005.

Xu et al., "Performance Modeling and Prediction of Enterprise JavaBeans with Layered Queuing Network Templates", Proceedings of the 2005 Conference on Specification and Verification of Component-Based Systems (2006).

Felix-Simpson, "Analytic Representations of MVS I/O Subsystems", International Conference on the Management and Performance Evaluation of Computer Systems, pp. 721-725 (1985).

Raatikainen, "Cluster Analysis and Workload Classification", Performance Evaluation Review, vol. 20, No. 4, Feb. 25, 1993.

Liu et al., "Parameter Inference of Queueing Models for IT Systems using End-to-End Measurements", Proceedings of SIGMETRICS—Performance 2004.

\* cited by examiner

FIG. 1

| Server 1 | Server 2 | Server 3 | Server 4 | Server 5 | Server 6 | Transaction |
|---|---|---|---|---|---|---|
| 0.005 | 0 | 0.005 | 0.005 | 0.005 | 0.005 | #WMLClick10Links |
| 0.005 | 0 | 0.005 | 0.005 | 0.005 | 0.005 | #WMLClick20Links |
| 0.005 | 0 | 0.005 | 0.005 | 0.005 | 0.005 | #WMLClick5Links |
| 0.005 | 0 | 0.005 | 0.005 | 0.005 | 0.005 | #WMLClickMobilePortal |
| 0.005 | 0 | 0.005 | 0.005 | 0.005 | 0.005 | #WMLClickOneLink |
| 0.005 | 0 | 0.005 | 0.005 | 0.005 | 0.005 | #WMLClickImageForm |
| 0.005 | 0 | 0.005 | 0.005 | 0.005 | 0.005 | #WMLClickImagePortlet |
| 0.005 | 0.01 | 0.005 | 0.005 | 0.005 | 0 | #WMLClickLoginPost |
| 0.005 | 0 | 0.005 | 0.005 | 0.005 | 0.005 | #WMLClickPortal |
| 0.005 | 0 | 0.005 | 0.005 | 0.005 | 0.005 | #WMLClickVisitClientCapPortlet |
| 0.005 | 0 | 0.005 | 0.005 | 0.005 | 0.005 | #WMLClickVisitMobileReminder |
| 0.005 | 0 | 0.005 | 0.005 | 0.005 | 0.005 | #WMLClickVisitReminderPortlet |
| 0.005 | 0 | 0.005 | 0.005 | 0.005 | 0.005 | #WMLClickX |

RUN-TIME CHARACTERIZATION OF ON-DEMAND ANALYTICAL MODEL ACCURACY

CROSS-REFERENCE TO RELATED APPLICATIONS

This is a Continuation of application Ser. No. 11/563,048, filed Nov. 24, 2006, now U.S. Pat. No. 7,512,519, issued Mar. 31, 2009, the entirety of which is incorporated herein by reference.

BACKGROUND OF THE INVENTION

Analytical performance models are mathematical approximations of real world systems that can be used to predict certain behaviors of the systems being modeled. Examples of analytical modeling techniques can include, but are not limited to, Petri Net, colored Petri Net, and queuing theory. While each technique can be used to analyze different systems, queuing theory has been applied to a variety of modern systems. Queuing theory refers to the mathematical study of waiting lines, or queues. One type of system that can be modeled using queuing theory is a communication system that includes queuing servers. This is but one example as analytical models and queuing models can be used to model other real world systems such as bank or store check-out lines, telephone call banks, or the like.

With reference to a queuing model, once the model is created for a given system, the behavior of that system can be predicted in terms of different performance related measures. These measures can include, but are not limited to, the expected amount of time that a given object will be stored within a queue before being processed, the expected number of objects within a queue at a particular time, the probability the queue will be empty, the time to service for a particular type of object, or the like. Analytical models such as queuing models frequently are used to predict whether a particular system will be able to meet established quality of service metrics, such as response time.

Analytical models can use parameters measured from the actual system being modeled, which can be both difficult and costly to collect. In other cases, parameters from similar systems or parameters determined from past experience can be used. In any case, collecting too much information adds unnecessary cost to analytical model construction since the accuracy of the analytical model begins to converge to a fairly constant level despite increasing amounts of data. On the other hand, collecting too little information decreases cost but can result in an analytical model with a level of accuracy that is too low to be useful. Further complicating matters, once an analytical model has been built, the underlying, or modeled, system may undergo further change. This typically requires that the analytical model be rebuilt, which is a time consuming, manual process. It therefore becomes desirable to have some indication as to the amount of data needed to create an analytical model for a selected system.

BRIEF SUMMARY OF THE INVENTION

The present invention is directed to predicting the behavior of a system through the use of analytical models and, further, to determining the amount of data needed in order to create an analytical model having a specified level of accuracy. One embodiment of the present invention can include a method of determining accuracy of predicted system behavior. The method can include creating a plurality of noise adjusted analytical models, wherein each noise adjusted analytical model is associated with a set of predefined analytical model parameters. A set of inferred analytical model parameters for each noise adjusted analytical model can be derived. Each set of inferred analytical model parameters depends upon a current noise adjusted analytical model and each prior noise adjusted analytical model. For each set of inferred analytical model parameters, a measure of error between the set of inferred analytical model parameters and the set of predefined analytical model parameters associated with the noise adjusted analytical model from which the set of inferred analytical model parameters was derived can be determined.

Another embodiment of the present invention can include a method of determining an amount of sample data needed to create an analytical model having a predetermined level of accuracy. The method can include identifying a data source comprising a plurality of entries, wherein each entry includes a level of noise, a level of accuracy, and a number of sets of system measurements needed to generate an analytical model with the level of accuracy indicated in the entry. The method further can include computing a level of noise from measured parameters of a system, selecting a desired level of accuracy, and locating an entry according to the level of noise and the desired level of accuracy. The number of sets of system measurements needed to generate an analytical model having the desired level of accuracy can be read from the entry.

Yet another embodiment of the present invention can include a computer program product having a computer usable medium with computer usable program code that, when executed, causes a machine to perform the various steps and/or functions described herein.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit", "module", or "system".

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. The medium can be, for example, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, an optical storage medium, such as an optical disk including a compact disk—read only memory (CD-ROM), a compact disk—read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include transmission mediums such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention relates to predicting the behavior of a communication system using an analytical model. In accordance with the inventive arrangements disclosed herein, the number of samples, or datasets, needed to generate an analytical model having a specified level of accuracy can be determined given inputs such as the level of noise in the system and the desired accuracy or error of the analytical model being constructed.

Analytical models for a system can be created from a plurality of sets of predefined analytical model parameters. The analytical models can be altered by adding noise. A set of inferred analytical model parameters can be determined from each noise adjusted analytical model. The set of inferred analytical model parameters can be such that if provided to a network solver, would produce the noise adjusted analytical model. Each set of predefined analytical model parameters can be compared with a corresponding set of inferred analytical model parameters to determine and record a measure of error for each comparison. The process can be repeated for a range of datasets, i.e., sets of predefined analytical model parameters, and over a range of noise levels.

The collected data can be used to determine the number of datasets needed to create an analytical model provided that a level of noise and a desired level of accuracy, or error, are specified. By determining the amount of data needed to build an analytical model having a given level of accuracy, the likelihood that too much or too little data will be collected is reduced. Further, determining the amount of data needed can result in less costly analytical models that are able to predict system behavior(s) with at least a minimal level of accuracy. Since accuracy for a given analytical model can be determined, the accuracy of that model can be taken into account with respect to other decisions regarding the modeled system.

Figure 1:
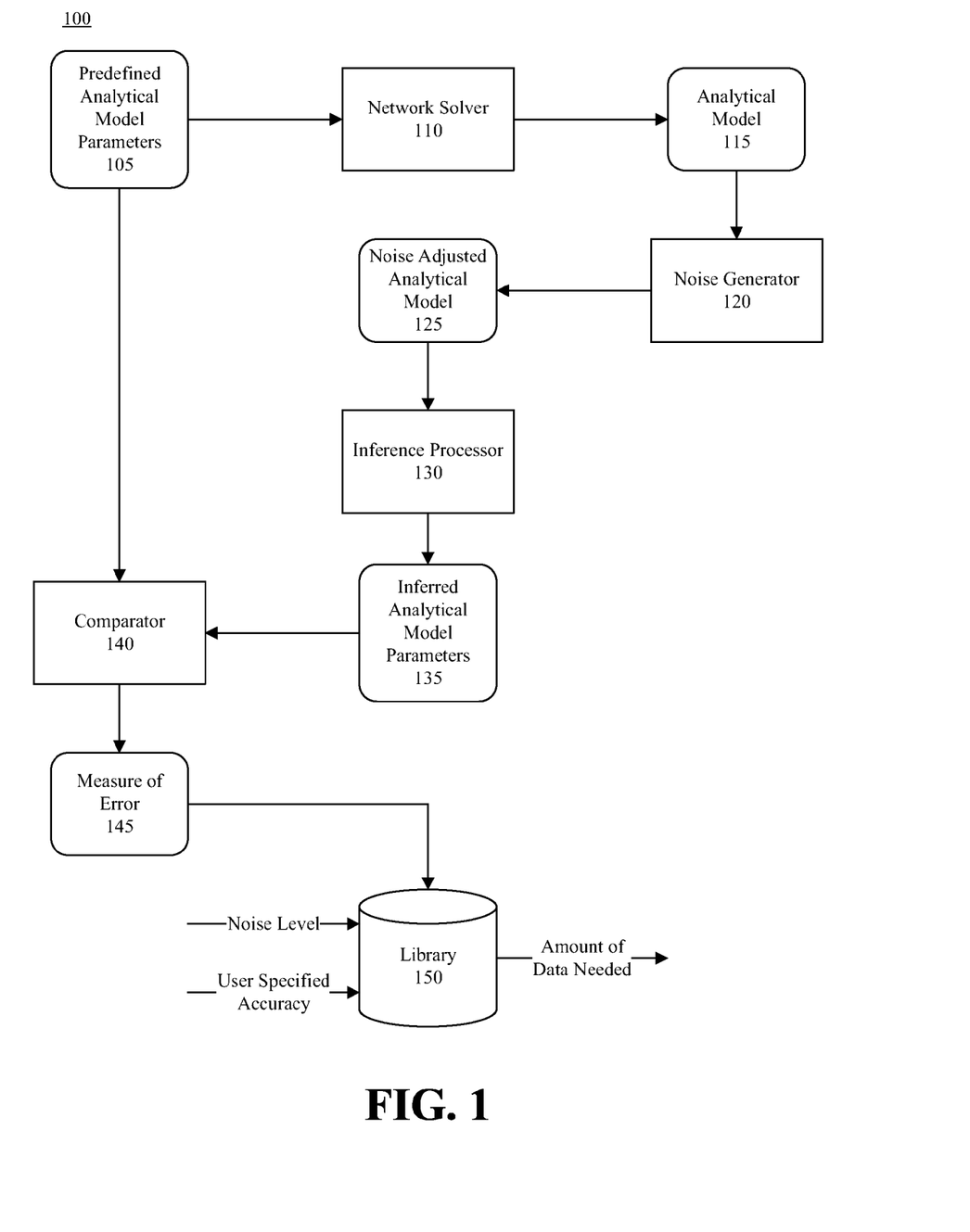
FIG. 1 is a block diagram illustrating a system in accordance with one aspect of the present invention.

FIG. 1 is a block diagram illustrating a system 100 in accordance with one aspect of the present invention. The system 100 can be used to create a library 150. The library 150 can indicate an amount of data needed to generate an analytical model that can approximate the behavior of a particular system with a specified level of accuracy. The system 100 can be applied to any of a variety of different analytical models such as Petri Nets, colored Petri Nets, queuing models, or the like. Accordingly, although references are made to queuing models within this specification, those skilled in the art will appreciate that the various methods, systems, and techniques disclosed herein can be applied to other analytical models.

As shown, a network solver 110 can receive a set of predefined analytical model parameters 105. The predefined analytical model parameters 105 can be parameters that have been specified for a particular system. In one aspect, the system can be a communication system. In that case, the system can include one or more known processing nodes, i.e., servers or other hardware that can be modeled as a queuing server. For example, the predefined analytical model parameters 105 can include, but are not limited to, the amount of time each respective queuing server within the communication system being modeled requires for processing or handling a particular type of transaction, or event, and the number of visits to each respective server that each transaction requires.

It should be appreciated that the embodiments disclosed herein can be applied to any of a variety of different real world systems. Examples of such systems can include, bank teller lines, store checkout lines, phone systems, or the like. Thus, while a communication system is used from time to time as an example, it is not intended to limit the present invention to modeling only one type of system.

The transactions, or jobs, performed by the communication system can vary in terms of function and the resources needed or used when performing the transactions. For example, a transaction such as navigating Web pages during an online shopping session can require a different amount of time and/or number of visits to various servers of the communication system than a transaction such as searching a Website. The amount of time needed for a given transaction can be specified on a per transaction basis and further can be specified on a per server basis for each transaction type. In one aspect, the predefined analytical model parameters 105 can be arbitrarily set. In another aspect, the predefined analytical model parameters 105 can be estimated according to known attributes of the actual hardware or servers within the communication system being modeled.

From the predefined analytical model parameters 105, the network solver 110 can create or generate an analytical model 115. Those skilled in the art will recognize that network and/or model solvers, such as queuing model solvers, are software programs that are known in the art. As such, the particular network solver that is used is not intended to limit the present invention. Rather, any of a variety of available network solvers can be used.

The resulting analytical model 115 can specify behavioral information for the system for which the predefined analytical model parameters 105 were created. The analytical model 115 can be a function which, when solved, provides system behavior information. For example, in the case of a communication system, the analytical model 115, when solved, can specify information such as expected central processing unit (CPU) utilizations as well as expected response times for a variety of different case scenarios involving the communication system. As known, CPU utilization can be specified in terms of a percentage, i.e., 10%, 20%, 30%, or 50% utilization, etc., while response time can be specified in terms of seconds or some fraction of a second, such as milliseconds.

The analytical model 115, for example the behavioral information provided by the analytical model 115, can be provided to a noise generator 120 which can add a specified level of noise to the analytical model 115, thereby resulting in a noise adjusted analytical model 125. In illustration, if a noise level of 1.0% is specified, the level of any parameter in the analytical model, i.e., CPU usage and/or response time, can be changed by ±0.5%. Thus, for a CPU usage of 50.0%, the noise adjusted CPU usage for the analytical model can be adjusted to values between 49.5% and 50.5%. Such can be the case across all values provided or estimated by the analytical model 115.

The noise adjusted analytical model 125 can be provided to an inference processor 130. The inference processor 130 can, given an "analytical model A" as input, return the set of analytical model parameters that, if processed by a network solver such as the network solver 110, would provide the "analytical model A" as output. The inference processor 130 applies processing techniques that are nonlinear in nature. Accordingly, the resulting inferred analytical model parameters 135 generated as output are not easily predicted from the noise adjusted analytical model 125 provided to the inference processor 130 as input. That is, the effects of adding noise to the analytical model 115 are not easily predicted due to the nonlinearity of the analytical models, the queuing math, and the behavior of the inference processor 130. It should be appreciated that while the various computations noted herein are discussed with reference to software tools that implement the functions in a semi-automated, or entirely automated fashion, one or more of the processes described herein also can be performed manually if so desired.

In any case, in one embodiment, the inference processor 130 can be implemented as an optimization-based inference processor. In such an embodiment, the end-to-end measurement data (i.e. system throughput, utilization of the servers, and end-to-end response times) are presumed to be available. Each set of end-to-end measurements can be formulated as a set of tractable, quadratic programs. Based upon the formulation, a self-adjusting nesting procedure, which makes explicit use of the underlying problem's structural properties, is applied to solve the problem. The non-uniqueness of the solution to each quadratic program and the presence of multiple sets of measurements are used to obtain queuing network parameters that maintain a representation of the entire set of solutions to the data. The inference processor can detect and remove outlying sets of measurements. Further detail regarding an inference processor as described herein can be found in Liu Z., Wynter L., Xia C. H. and Zhang F., "Parameter Inference of Queueing Models for IT Systems using End-to-End Measurements", Performance Evaluation, 63 (2006): 36-60, or in Wynter L., Xia C. H. and Zhang F. "Parameter Inference of Queueing Models for IT Systems using End-to-End Measurements", PDF, Proceedings of SIGMETRICS-Performance 2004, which both are incorporated herein by reference.

The inferred analytical model parameters 135 can be provided to a comparator 140 which compares the inferred analytical model parameters 135 with the predefined analytical model parameters 105. The comparator 140 can generate a measure of error 145, or error, between the two sets of analytical model parameters. In one aspect, the measure of error 145 can be calculated according to the average relative error over the entire set of analytical model parameters. In another aspect, a sum of squares technique can be used. It should be appreciated that any of a variety of suitable error functions can be used and the particular error function used is not intended to limit the present invention. The measure of error 145 can be stored within the library 150. In addition, an indication of the number of datasets upon which that measure of error 145 is based can be stored.

The entire process described with reference to FIG. 1 can iterate multiple times. During each iteration, a different set of predefined model parameters 105 can be processed. As the inference processor 130 continues to iterate, the inference processor 130 can begin to filter out the noise and converge on a solution. The set of inferred analytical model parameters 135 generated during each iteration depends not only upon the noise adjusted analytical model 125 being processed in the current iteration, but also upon each prior noise adjusted analytical model 125 processed in prior iterations.

In illustration, a set of "predefined analytical model parameters A" is used to create an "analytical model A" and a "noise adjusted analytical model A". A set of "inferred analytical model parameters A" is generated by the inference processor 130. The error between the "inferred analytical model parameters A" and the "predefined analytical model parameters A" is determined as "measure of error A". The "measure of error A" can be stored along with a dataset counter value of "1" and an indication of the level of noise that was used to create the "noise adjusted analytical model A". The dataset counter value of "1" indicates that the "measure of error A" corresponds to one dataset. That is, the "inferred analytical model parameters A" were determined from one dataset, in this case the "noise adjusted analytical model A", or the underlying set of "predefined analytical model parameters A" used to create "analytical model A".

The process can be repeated. A set of "predefined analytical model parameters B" can be used to generate an "analytical model B" and a "noise adjusted analytical model B". A set of "inferred analytical model parameters B" can be determined. The error between the "inferred analytical model parameters B" and the "predefined analytical model parameters B" can be calculated as the "measure of error B". The "measure of error B" can be stored with dataset counter value of "2" and the level of noise that was used to create the "noise adjusted analytical model B". The dataset counter value of "2" indicates that the "measure of error B" corresponds to two datasets. That is, the "inferred analytical model parameters B" are determined not only from the "noise adjusted analytical model B", but also from the "noise adjusted analytical model A", i.e., each prior input to the inference processor 130. Notwithstanding, it should be appreciated that the processes described above also can be performed multiple times for each noise level to obtain a more statistically accurate number or measure.

As the process continues to iterate, the library 150 is constructed with different measures of error corresponding to increasing numbers of data sets, i.e., 1, 2, 3, 4, 5, etc., for particular levels of noise. Thus, a measure of error between "inferred analytical model parameters C" and "predefined analytical model parameters C" will correspond to 3 datasets as the "inferred analytical model parameters C" are created from the "noise adjusted analytical models A, B, and C". The level of noise added to the "analytical model C" to create the "noise adjusted analytical model C" can be stored along with the "measure of error C".

While the predefined analytical model parameters 105 can be varied to create a plurality of sets of predefined analytical model parameters upon which the library 150 can be built, it should be appreciated that the noise level that is used to create the noise adjusted analytical models also can be varied. For a given iteration, the noise level can be varied, the predefined model parameters can be varied thereby creating a new set of predefined model parameters 105, or both can be varied. The resulting data stored in the library 150 can reflect measures of error for a given analytical model over an entire range of noise levels and over an entire range of datasets, i.e., sets of predefined analytical model parameters 105.

Figure 2:
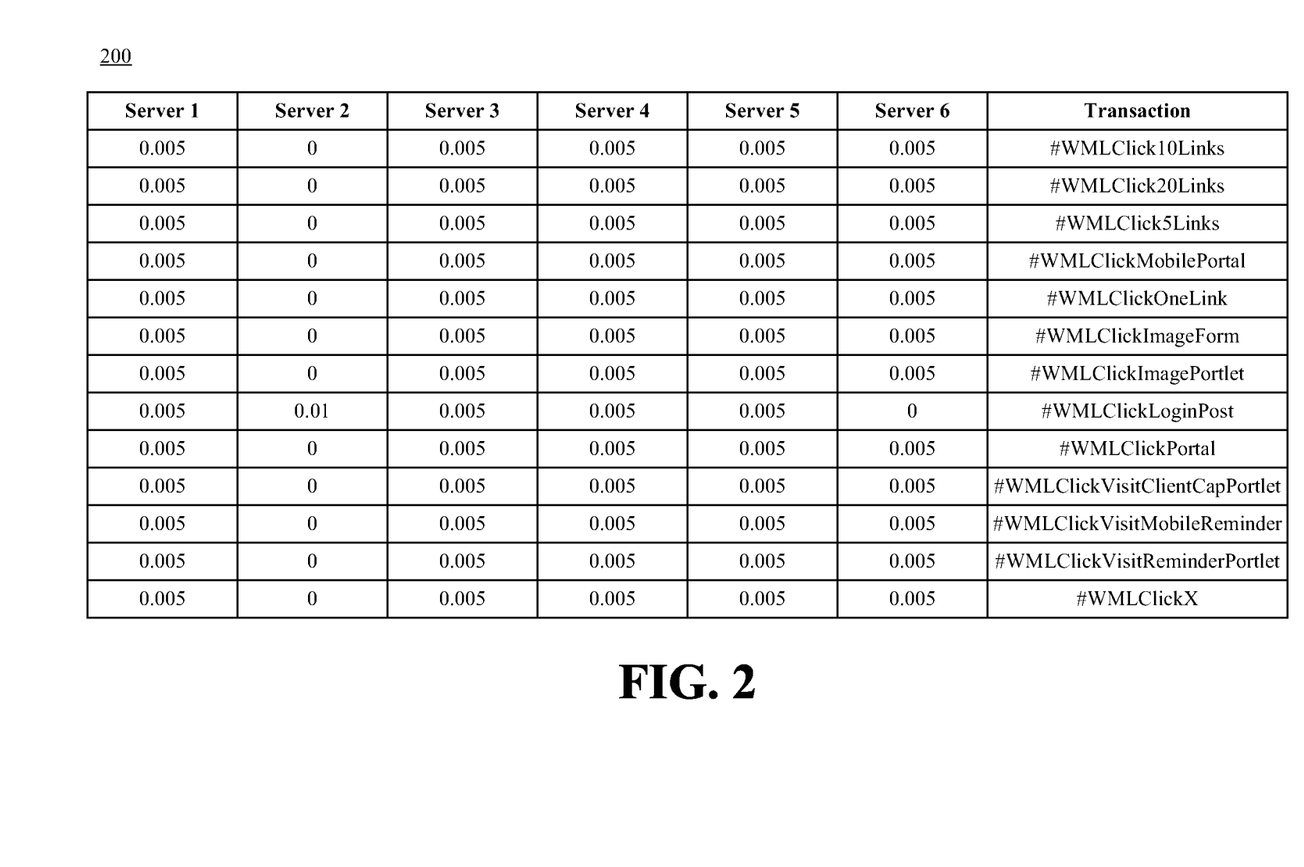
FIG. 2 is a table illustrating a set of predefined analytical model parameters in accordance with another aspect of the present invention.

FIG. 2 presents a table 200 illustrating a set of predefined analytical model parameters in accordance with another aspect of the present invention. The table 200 is illustrative of the data that comprises the predefined analytical model parameters upon which an analytical model can be built. In one aspect, the values of the table 200 can be estimates of the response times for the various servers of a communication system and can be estimated based upon known hardware of each respective server and various other parameters. In another embodiment, however, the values can be arbitrarily set.

As shown, the table 200 specifies the amount of time needed for a given server within the communication system being modeled to respond to a request as part of a given transaction. For example, from the table 200, it can be seen that for a transaction of "#WMLClick10Links", servers 1, 3, 4, 5, and 6 are involved. Each has a response time of 0.005 seconds. Server 2 is not involved in the "#WMLClick10Links" transaction. It should be appreciated that the various servers 1-6 of table 200 can represent different varieties of servers within a communication system including, but not limited to, HTTP servers, authentication servers, application servers, database servers, and the like.

Additional information can be specified, which is not shown in table 200, such as the number of times a particular server is visited to complete the specified transaction. For example, it may be the case that each server, with the exception of server 1, is visited only one time for the "#WMLClick10Links" transaction. Server 1 may be visited 3 times with each visit requiring 0.005 seconds to complete.

Figure 3:
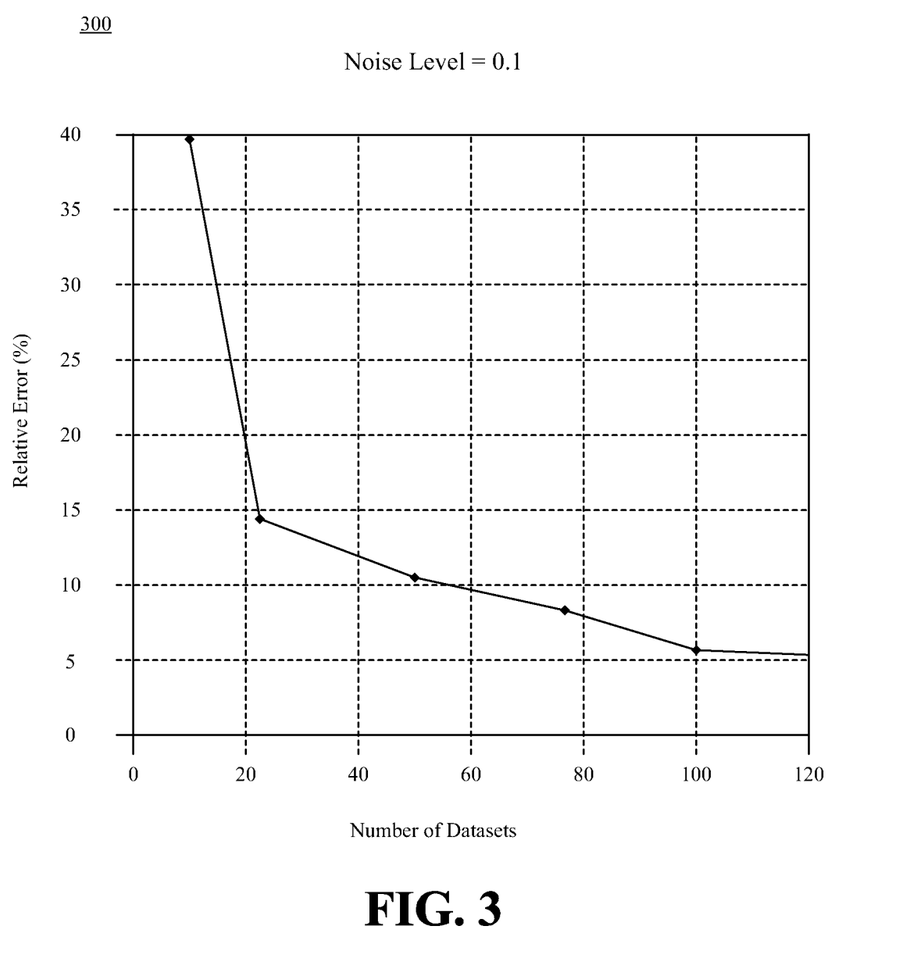
FIG. 3 is a graph illustrating another aspect of the present invention.

FIG. 3 presents a graph 300 in accordance with another aspect of the present invention. The graph 300 illustrates a relationship between relative error of a given analytical model versus the number of datasets used to generate the model. The graph 300 illustrates the manner in which accuracy for an analytical model increases (error decreases) as the number of datasets upon which that analytical model is built increases. The data reflected in the graph 300 pertains to a noise level of "0.1". The graph 300 is illustrative of the data that can be stored within the library 150 of FIG. 1. Further data can be stored for other noise levels, i.e., levels ranging from "0.0" to "1.0" at any desired granularity or interval.

Figure 4:
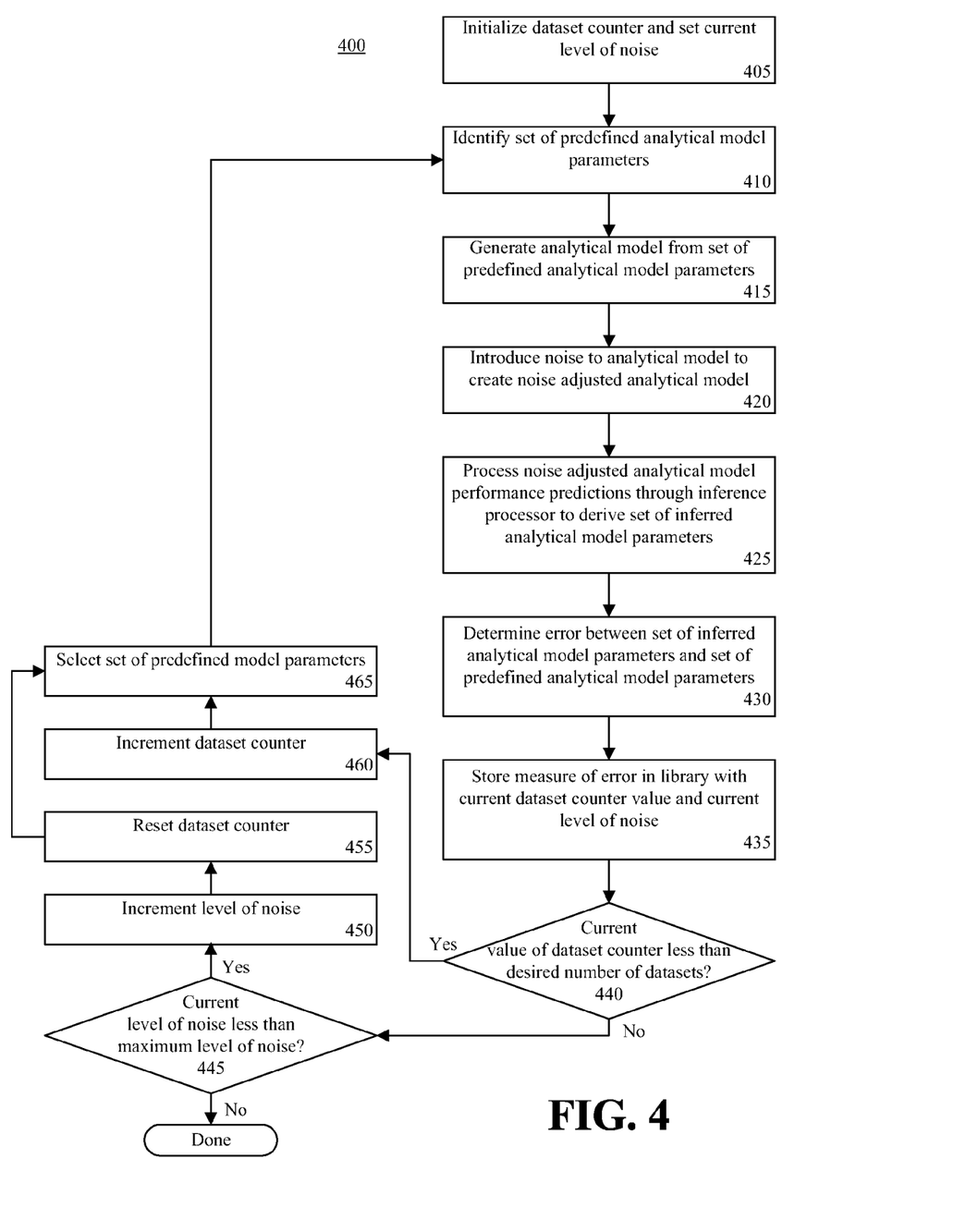
FIG. 4 is a flow chart illustrating a method in accordance with another aspect of the present invention.

FIG. 4 presents a flow chart illustrating a method 400 in accordance with another aspect of the present invention. The method 400 can be performed by a system such as the one described with reference to FIG. 1 to generate the library of data. Accordingly, in step 405, a dataset counter can be initialized to a value of "1" and a minimum level of noise can be established as the current level of noise. For example, the level of noise initially can be set to a minimum level of noise, such as "0.1" such that it is continually incremented throughout a defined range. In another example, the level of noise can be set to a maximum, such as "1.0", and continually reduced until a minimum level of noise is reached for the established range.

In step 410, a set of predefined analytical model parameters can be identified or selected as the current set of predefined analytical model parameters. In step 415, an analytical model can be created from the current set of predefined analytical model parameters using a network solver. In step 420, noise can be introduced into the analytical model created in step 415. The noise can be added at the current level of noise. The addition of noise to the analytical model results in the noise adjusted analytical model.

In step 425, the noise adjusted analytical model performance predictions can be processed through the inference processor to determine a set of inferred analytical model parameters. In step 430, a measure of error between the set of inferred analytical model parameters and the current set of predefined analytical model parameters can be determined. In step 435, the measure of error can be stored within a library. The measure of error can be stored with the current value of the dataset counter and the current level of noise.

In step 440, a determination can be made as to whether the desired number of datasets has been processed. The current value of the dataset counter can be compared with a threshold value indicating the desired number of datasets to be processed, i.e., 100, 150, 200, etc. If the current value of the dataset counter is less than the established threshold, the method can proceed to step 460. If not, the method can continue to step 445. Continuing with step 460, the value of the dataset counter can be incremented. In step 465, a next set of predefined analytical model parameters can be selected. The method can continue to step 410 to continue processing.

Proceeding to step 445, a determination can be made as to whether datasets over the entire range of desired levels of noise have been processed. The current level of noise can be compared with an established maximum level of noise. If the current level of noise is less than the maximum level of noise, the method can proceed to step 455. If not, the method can end as the desired amount of data in terms of the number of datasets over the entire range of noise levels has been processed.

In step 450, the level of noise can be incremented, for example by "0.1". In step 455, the dataset counter can be reset to a value of "1". Continuing with step 465, a set of predefined analytical model parameters can be selected. Since the process has iterated through the total number of available datasets, the method can select, for example, the first of the plurality of sets of predefined analytical model parameters and continue processing each of the plurality of sets of predefined model parameters using the new level of noise.

Once the method described with reference to FIG. 4 completes, a library of data, i.e., library 150 of FIG. 1, is constructed. The library can provide an indication of the number of datasets necessary to build an analytical model given a particular level of noise and a desired level of accuracy, i.e., a desired measure of error.

Figure 5:
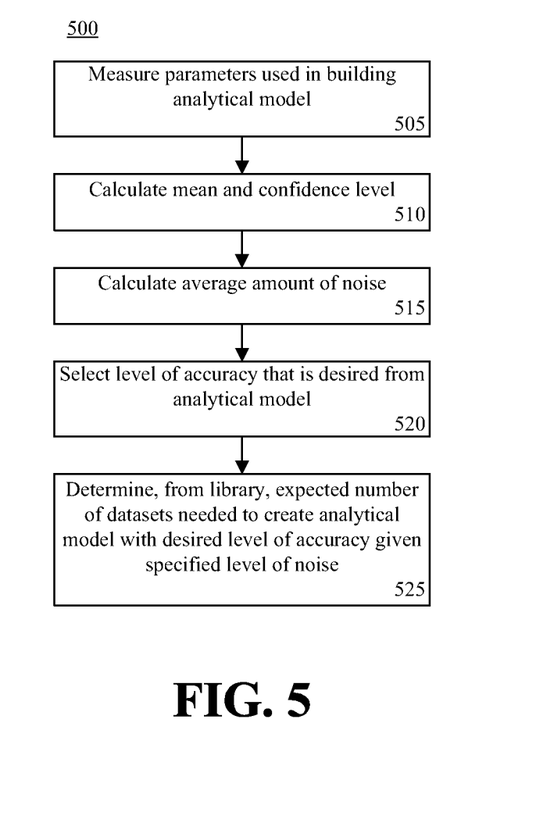
FIG. 5 is a flow chart illustrating a method in accordance with another aspect of the present invention.

FIG. 5 presents a flow chart illustrating a method 500 in accordance with another aspect of the present invention. The method 500 illustrates one manner of using the library developed as described with reference to FIGS. 1-4. In step 505, one or more sets of parameters used to build or generate the analytical model can be measured from the actual communication system that is to be modeled.

In step 510, a mean for the various parameters can be calculated along with a confidence level. This information can be calculated statistically. The confidence level can be said to indicate a "true" mean. The confidence level can indicate that, for example, the mean is 50% for 99% of the time, or the mean is between 45% and 50% for 99% of the time, etc.

In step 515, an average amount of noise for the different parameters can be calculated. In illustration, if the mean is determined to be 50% for a given parameter and an actual value of 45% is measured, the error can be said to be approximately 5% if 50 samples of the parameter have been collected. The average amount of noise, at least for a given parameter, can be calculated according to the expression [(mean−actual)/(# of samples)]. The average amount of noise can be averaged for each of the parameters for the communication system to determine the average relative amount of noise in the communication system. As noted, any of a variety of different measures of noise can be used and the present invention is not intended to be limited to one particular type of measurement or noise estimation function.

In step 520, a desired level of accuracy can be selected or specified for the analytical model to be generated. The level of accuracy can be expressed as a measure of error from the analytical model and further can be expressed as a percentage. In step 525, the desired level of accuracy and the average relative amount of noise can be provided to the library as input. Given the desired level of accuracy and the average relative amount of noise in the communication system, the library can provide a value that indicates the number of datasets, or samples, that would be needed to produce an analytical model having the desired level of accuracy for the communication system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method of determining accuracy of predicted system behavior comprising:
    via a processor, creating a plurality of noise adjusted analytical models, wherein each noise adjusted analytical model is associated with a set of predefined analytical model parameters;
    via the processor, deriving a set of inferred analytical model parameters for each noise adjusted analytical model, wherein each set of inferred analytical model parameters depends upon a current noise adjusted analytical model and each prior noise adjusted analytical model; and
    for each set of inferred analytical model parameters, via the processor, determining a measure of error between the set of inferred analytical model parameters and the set of predefined analytical model parameters associated with the noise adjusted analytical model from which the set of inferred analytical model parameters was derived.

2. The method of claim 1, wherein creating a plurality of noise adjusted analytical models further comprises:
    generating an analytical model for each set of predefined analytical model parameters; and
    adding noise to each analytical model to create a noise adjusted analytical model.

3. The method of claim 2, further comprising, via the processor, varying a level of noise added to each analytical model to create the plurality of noise adjusted analytical models.

4. The method of claim 1, wherein creating a plurality of noise adjusted analytical models further comprises:
    via the processor, generating an analytical model for each set of predefined analytical model parameters; and
    for each analytical model, via the processor, adding varying levels of noise throughout a predefined range to create a plurality of noise adjusted analytical models.

5. The method of claim 1, further comprising, for each measure of error, via the processor, storing the measure of error and an indication of a number of noise adjusted analytical models used to derive the set of inferred analytical model parameters for which the measure of error is determined.

6. The method of claim 5, further comprising, for each measure of error, via the processor, storing an indication of a level of noise added to the current noise adjusted analytical model used to derive the inferred analytical model parameters for which the measure of error was determined.

7. The method of claim 6, further comprising, responsive to receiving an input specifying a desired measure of error and a level of noise, via the processor, determining a number of datasets needed to generate an analytical model having the desired measure of error.

8. A method of determining an amount of sample data needed to create an analytical model having a predetermined level of accuracy, the method comprising:
    via a processor, identifying a data source comprising a plurality of entries, wherein each entry includes a level of noise, a level of accuracy, and a number of sets of system measurements needed to generate an analytical model with the level of accuracy indicated in the entry;
    via the processor, computing a level of noise from measured parameters of a system;
    via the processor, selecting a desired level of accuracy; and
    via the processor, locating an entry according to the level of noise and the desired level of accuracy and reading the number of sets of system measurements needed to generate an analytical model having the desired level of accuracy.

9. The method of claim 8, further comprising:
    via the processor, creating a plurality of noise adjusted analytical models, wherein each noise adjusted analytical model is associated with a set of predefined analytical model parameters;
    via the processor, deriving a set of inferred analytical model parameters for each noise adjusted analytical model, wherein each set of inferred analytical model parameters depends upon a current noise adjusted analytical model and each prior noise adjusted analytical model; and
    for each set of inferred analytical model parameters, via the processor, determining a measure of error between the set of inferred analytical model parameters and the set of predefined analytical model parameters associated with the noise adjusted analytical model from which the set of inferred analytical model parameters was derived.

10. The method of claim 9, wherein creating a plurality of noise adjusted analytical models further comprises:
    generating an analytical model for each set of predefined analytical model parameters; and
    adding noise to each analytical model to create a noise adjusted analytical model.

11. The method of claim 10, further comprising, via the processor, varying a level of noise added to each analytical model to create the plurality of noise adjusted analytical models.

12. The method of claim 9, wherein creating a plurality of noise adjusted analytical models further comprises:
    generating an analytical model for each set of predefined analytical model parameters; and
    for each analytical model, adding varying levels of noise throughout a predefined range to create a plurality of noise adjusted analytical models.

13. The method of claim 9, further comprising, for each measure of error, via the processor, storing the measure of error and an indication of a number of noise adjusted analytical models used to derive the set of inferred model parameters for which the measure of error is determined.

14. The method of claim 13, further comprising, for each measure of error, via the processor, storing an indication of a level of noise added to the current noise adjusted analytical model used to derive the inferred model parameters for which the measure of error was determined.

15. A computer program product, comprising:
    a computer-readable storage device having computer usable program code stored thereon that determines accuracy of predicted system behavior, said computer program product including:
        computer usable program code that creates a plurality of noise adjusted analytical models, wherein each noise adjusted analytical model is associated with a set of predefined analytical model parameters;
        computer usable program code that derives a set of inferred analytical model parameters for each noise adjusted analytical model, wherein each set of inferred analytical model parameters depends upon a current noise adjusted analytical model and each prior noise adjusted analytical model; and
        computer usable program code that, for each set of inferred analytical model parameters, determines a measure of error between the set of inferred analytical model parameters and the set of predefined analytical model parameters associated with the noise adjusted analytical model from which the set of inferred analytical model parameters was derived, wherein the computer-readable storage device does not consist of a transitory, propagating signal.

16. The computer program product of claim 15, wherein the computer usable program code that creates a plurality of noise adjusted analytical models further comprises:
   computer usable program code that generates an analytical model for each set of predefined analytical model parameters; and
   computer usable program code that adds noise to each analytical model to create a noise adjusted analytical model.

17. The computer program product of claim 16, further comprising computer usable program code that varies a level of noise added to each analytical model to create the plurality of noise adjusted analytical models.

18. The computer program product of claim 15, further comprising, computer usable program code that, for each measure of error, stores the measure of error and an indication of a number of noise adjusted analytical models used to derive the set of inferred analytical model parameters for which the measure of error is determined.

19. The computer program product of claim 18, further comprising, computer usable program code that, for each measure of error, stores an indication of a level of noise added to the current noise adjusted analytical model used to derive the inferred analytical model parameters for which the measure of error was determined.

20. The computer program product of claim 19, further comprising, computer usable program code that, responsive to receiving an input specifying a desired measure of error and a level of noise, determines a number of datasets needed to generate an analytical model having the desired measure of error.

* * * * *